United States Patent [19]
Zheng

[11] Patent Number: 6,067,178
[45] Date of Patent: May 23, 2000

[54] MULTIPLE WAVELENGTH DIVISION MULTIPLEXER WITH REDUCED LOSS

[75] Inventor: Yu Zheng, Sunnyvale, Calif.

[73] Assignee: Oplink Communications, Inc., San Jose, Calif.

[21] Appl. No.: 08/931,434

[22] Filed: Sep. 16, 1997

[51] Int. Cl.[7] .............................. H04J 14/02; G02B 1/10; G02B 5/28; G02B 6/28
[52] U.S. Cl. .......................... 359/124; 359/124; 359/125; 359/584; 359/589; 385/24
[58] Field of Search ..................................... 359/124, 125, 359/584, 589; 385/24

[56] References Cited

U.S. PATENT DOCUMENTS

| | | | |
|---|---|---|---|
| 5,642,448 | 6/1997 | Pan et al. | 385/31 |
| 5,796,502 | 8/1998 | Haller | 359/124 |
| 5,808,762 | 9/1998 | Vanoli et al. | 359/124 |
| 5,864,413 | 1/1999 | Feldman | 359/125 |

*Primary Examiner*—Jason Chan
*Assistant Examiner*—Mohammad Sedighian
*Attorney, Agent, or Firm*—Sawyer Law Group LLP

[57] ABSTRACT

A system and method for providing wavelength division multiplexer is disclosed. The wavelength division multiplexer is for separating an optical signal into a plurality of components. The wavelength division multiplexer includes a splitter and a plurality of isolators coupled to the splitter. The splitter is for separating the optical signal into a plurality of groups. Each group contains a portion of the plurality of components. The plurality of isolators correspond to the plurality of groups. Each of the plurality of isolators is for isolating each component of the corresponding group. In one embodiment, the splitter further includes a splitter input. In this embodiment, the wavelength division multiplexer further includes a filter coupled to the splitter input. The filter is for isolating one of the plurality of components.

6 Claims, 2 Drawing Sheets

6,067,178

MULTIPLE WAVELENGTH DIVISION MULTIPLEXER WITH REDUCED LOSS

FIELD OF THE INVENTION

The present invention relates to optical technology and more particularly to a method and system for implementing a multiple wavelength division multiplexer which provides decreased transmission loss.

BACKGROUND OF THE INVENTION

Optical technology offers the capability of transmitting a plurality of signals on a single fiber. As the use of optical technology increases, the number of signals transmitted on a signal fiber also increases. Currently, signals of four, eight, or sixteen different wavelengths are transmitted over a single fiber.

In order to transmit a large number of signals on a given cable, signals carried on a plurality wavelengths are multiplexed together for transmission. After the multiplexed, multi-channel signal reaches the destination, the signals are demultiplexed to access the information carried by a single channel. Conventional wavelength division multiplexers ("WDMs") are used to combine individual signals as well as separate a combination signal into individual wavelength signals.

To separate a combination signal into its components, conventional wavelength division multiplexers utilize a plurality filters cascaded in series to isolate each channel. Each filter passes light centered around a single wavelength. A filter is provided for each of the component wavelength. The output of each filter is the signal from a single wavelength. Thus, the signal is separated into its components.

Although such conventional systems can separate a signal into its components, a high insertion loss results. In the context of this application, the insertion loss is the loss for a particular component due to reflections in and transmission through the filters in a WDM. Each filter has a transmission loss as well as a reflection loss associated with it. As a result, the first component separated from the signal has the lowest insertion loss. The insertion loss increases for components separated from the signal later. This loss is highest for the last component isolated. The additional insertion loss further degrades the output signal for each component.

Accordingly, what is needed is a system and method for reducing the transmission loss associated with conventional wavelength division multiplexers. The present invention addresses such a need.

SUMMARY OF THE INVENTION

The present invention provides a method and system for providing wavelength division multiplexer. The wavelength division multiplexer is for separating an optical signal into a plurality of components. The wavelength division multiplexer comprises a splitter and a plurality of isolators coupled to the splitter. The splitter is for separating the optical signal into a plurality of groups. Each group contains a portion of the plurality of components. The plurality of isolators correspond to the plurality of groups. Each of the plurality of isolators is for isolating each component of the corresponding group. In one embodiment, the splitter further comprises a splitter input. In this embodiment, the wavelength division multiplexer further comprises a filter coupled to the splitter input. The filter is for isolating one of the plurality of components.

According to the system and method disclosed herein, the present invention provides a multiple channel wavelength division multiplexer having reduced insertion loss, thereby increasing overall system performance.

DETAILED DESCRIPTION OF THE INVENTION

The present invention relates to an improvement in optical technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
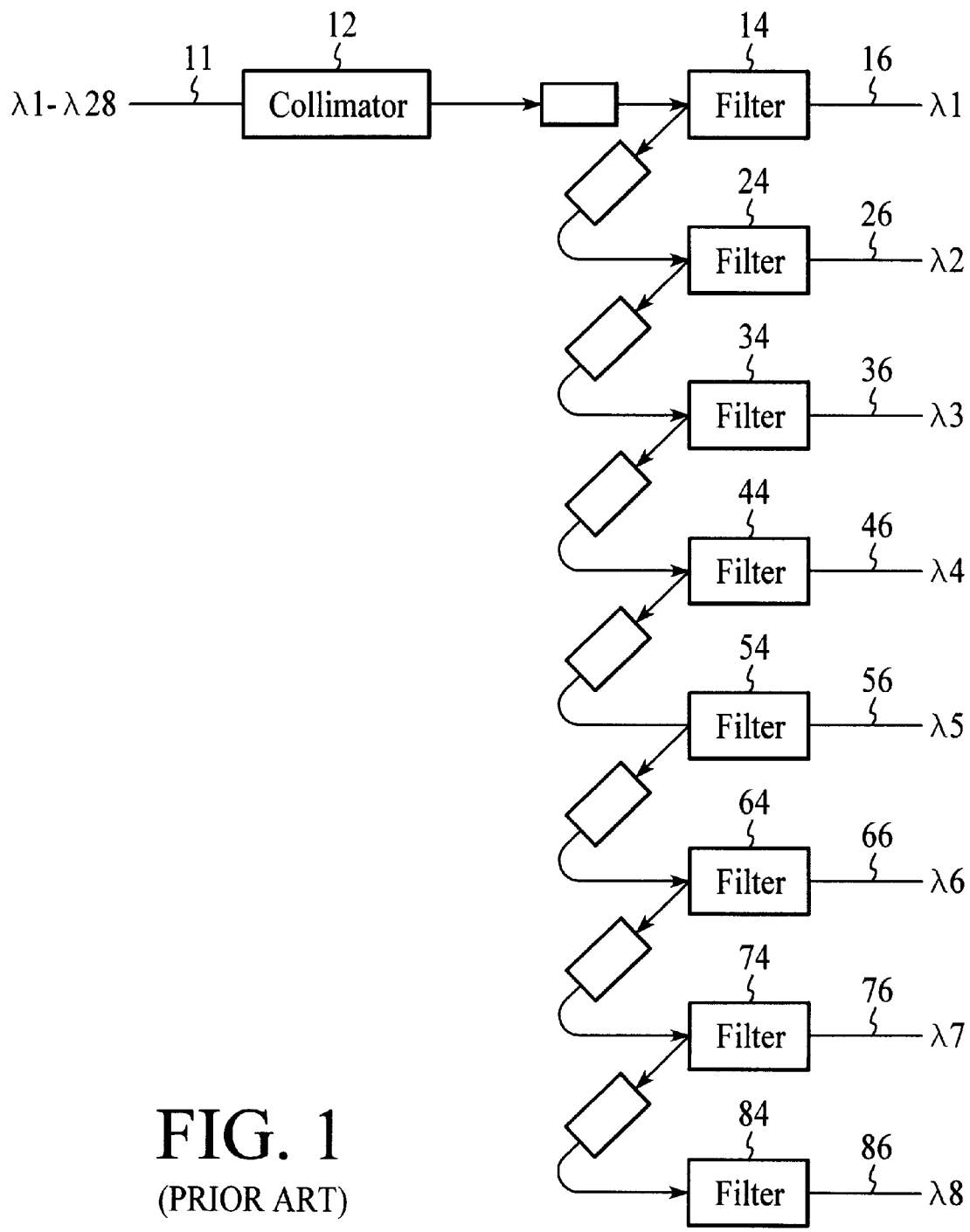
FIG. 1 is a block diagram of a conventional multiple wavelength division multiplexer.

FIG. 1 is a block diagram of a conventional multiple wavelength, or component, wavelength division multiplexer ("WDM") 10. As depicted in FIG. 1, the conventional WDM 10 is used to isolate the components of a combination signal carried on optical fiber 11 having eight components. Each component has a different wavelength, $\lambda 1$, $\lambda 2$, $\lambda 3$, $\lambda 4$, $\lambda 5$, $\lambda 6$, $\lambda 7$, and $\lambda 8$. Note, however, that optical fiber 11 could carry a signal having four, sixteen, or another number of components.

The combination signal is input from fiber 11 to a collimator 12. The combination signal is then transmitted to a first filter 14. The first filter 14 transmits light having a wavelength of $\lambda 1$. Consequently, the first component having a wavelength of $\lambda 1$ is isolated on fiber 16. The remainder of the signal, composed of components having wavelengths $\lambda 2$–$\lambda 8$, is reflected off of the filter 14 and transmitted to the filter 24. The filter 24 transmits light having a wavelength of $\lambda 2$ Consequently, the first component having a wavelength of $\lambda 2$ is isolated on fiber 2. The remainder of the signal, composed of components having wavelengths $\lambda 3$–$\lambda 8$, is reflected off of the filter 24 and transmitted to the filter 34. This process continues as the signal is cascaded through a series of filters 34, 44, 54, 64, 74, and 84. Each filter isolates one of the component signals.

Although the conventional WDM 10 shown in FIG. 1 is capable of isolating the components of a combination signal, those with ordinary skill in the art will realize that the insertion loss those components isolated farther down in the cascade of filters 14, 24, 34, 44, 54, 64, 74, and 84 is high. In the context of this application, the insertion loss is the loss for each component due to reflections in and transmission through the filters in a WDM.

Each filter 14, 24, 34, 44, 54, 64, 74, and 84 has a transmission loss and a reflection loss associated with it. The transmission loss is defined herein as $I_{TL}$. The reflection loss is defined as $I_{RL}$. Each time a signal is transmitted through a filter 14, 24, 34, 44, 54, 64, 74, or 84, a transmission loss of $I_{TL}$ is sustained. Similarly, each time a signal is reflected from a filter 14, 24, 34, 44, 54, 64, 74, or 84, a reflection loss of $I_{RL}$ is sustained.

The first component, having wavelength $\lambda 1$, is only transmitted through one filter 14. Consequently, the insertion loss for the first component is $I_{TL}$. The second component, having wavelength λ2, is reflected off of filter 14 and transmitted by filter 24. The insertion loss for the second component is, therefore, $I_{TL}+I_{RL}$. The insertion loss for the third component, having wavelength λ3, is $I_{TL}+2*I_{RL}$. In general, for the $r^{th}$ component, isolated by the $r^{th}$ filter, the insertion loss is given by $I_{TL}+(r-1)*I_{RL}$. Consequently, the insertion loss due to reflections accumulates for higher order channels. The worst case loss for a signal having eight components, as shown in FIG. 1, is $I_{TL}+7*I_{RL}$. The transmission loss, $I_{TL}$ is typically approximately 0.4 dB. The reflection loss, $I_{RL}$ is typically about 0.3 dB. Consequently, the worst case loss is approximately 2.5 dB.

The present invention provides for a method and system for providing a multiple wavelength WDM which reduces the insertion loss for higher order components. The present invention will be described in terms of a WDM which demultiplexes a signal having eight components. However, one of ordinary skill in the art will readily recognize that this method and system will operate effectively for signals having another number of components, including higher numbers of components.

The method and system comprise separating an input signal into groups of components. If the wavelengths of the components are in close, in one embodiment, the method and system include isolating at least one channel to aid in the separation of the input signal into groups of components. The components in each group can then be isolated, even using a cascaded series of filters. The components having the worst case insertion loss has a significantly lower insertion loss than in the worst case for a conventional WDM.

Figure 2:
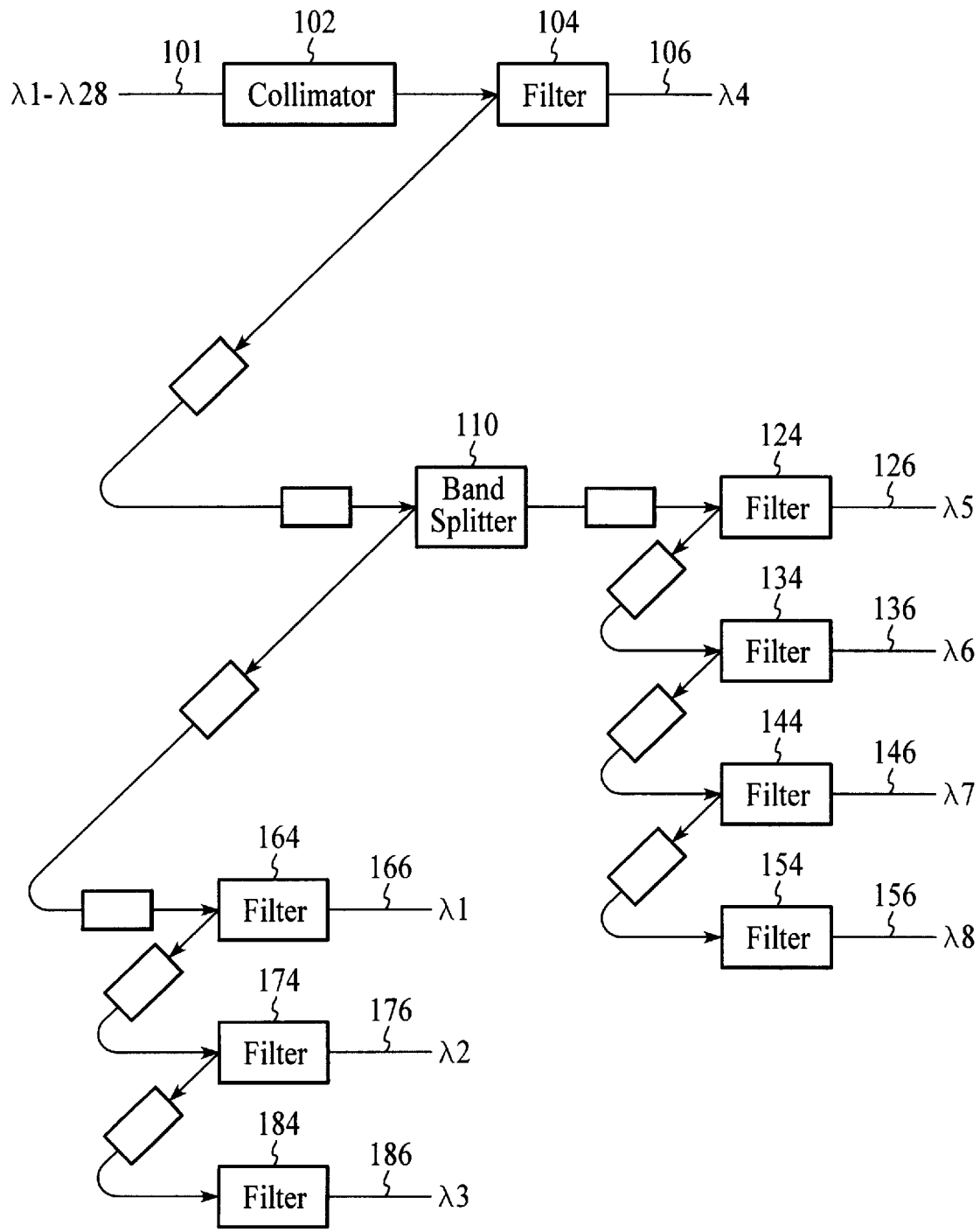
FIG. 2 is a block diagram of a multiple wavelength division multiplexer in accordance with the method and system.

To more particularly illustrate the method and system in accordance with the present invention, refer now to FIG. 2 depicting a block diagram of one embodiment of a WDM 100 in accordance with the method and system. The WDM of the present invention includes an optical fiber 101 through which an input signal is provided. In the WDM 100 shown, carries eight components. The first through eight components have wavelengths λ1, λ2, λ3, λ4, λ5, λ6, λ7, and λ8, respectively. The wavelength of the first component, λ1, is the smallest, while the wavelength of the eight component, λ8, is the largest. Although only eight components are depicted, the method and system function effectively for a signal having four, sixteen, or another number of components.

The signal is provided to the collimator 102 and a first filter 104. The filter 104 isolates a component having a wavelength in the center of the wavelengths of components carried. In the WDM 100, the filter 104 isolates the fourth component having wavelength λ4.

Isolating the fourth component allows a larger space between the third and fifth components having wavelengths λ3 and λ5, respectively. Isolating the fourth component thus allows the easier separation of the signal into two groups of components having wavelengths of λ1–λ3 and λ5–λ8. In an alternate embodiment, the fifth component could have been isolated, allowing easier separation of the signal into two groups of components having wavelengths of λ1–λ4 and λ6–λ8. Note, however, that where the separation between individual components is large enough, isolating one or more component before splitting the signal into groups of components may be unnecessary.

While the fourth component is transmitted by the filter 104, the first through third components and the fifth through eighth components are reflected by the filter 104. The reflected signal is transmitted to the bandsplitter 110. In a preferred embodiment, the bandsplitter 110 is a filter which transmits light having wavelengths λ5–λ8, but reflects other wavelengths, including λ1–λ3. Consequently, the bandsplitter 110 separates the remaining signal into a plurality of groups. Each group contains a plurality of components. Once this separation is completed, the components in each of the groups can be isolated. Note that although the WDM 100 is depicted as having a single bandsplitter which separates the signal into two groups of components, nothing prevents the method and system from use with another number of bandsplitters or from separating the signal into another number of groups.

In one embodiment, the components in each group are isolated using cascaded filters. For the first group, having the first through the third components, the filter 164 transmits light having a wavelength of λ1. Only the first component is, therefore, transmitted over fiber 166. The filter 174 transmits light having a wavelength of λ2. The second component is, therefore, isolated over fiber 176. The filter 184 transmits light having a wavelength of λ3. Thus, only the third component is transmitted over fiber 186.

For the second group, having the fifth through the eighth components, the filter 124 transmits light having a wavelength of λ5. The fifth component is, therefore, transmitted over fiber 126. The filter 134 transmits light having a wavelength of λ6. The sixth component is thereby isolated on fiber 136. The filter 144 transmits light having a wavelength of λ7. Thus, the seventh component is isolated on fiber 146. Finally, the filter 154 transmits light having a wavelength of λ8. Consequently, the eighth component is isolated on fiber 156.

Each filter in the WDM 100 can be a conventional filter. As a result, each filter 104, 124, 134, 144, 154, 164, 174, and 184 has a transmission loss and a reflection loss associated with it. The transmission loss is still $I_{TL}$. The reflection loss is still $I_{RL}$. Each time a signal is transmitted through a filter 104, 124, 134, 144, 154, 164, 174, or 184, a transmission loss of $I_{TL}$ is sustained. Similarly, each time a signal is reflected from a filter 104, 124, 134, 144, 154, 164, 174, or 184, a reflection loss of $I_{RL}$ is sustained.

The lowest insertion loss is for the fourth component, which has an insertion loss of $I_{TL}$. However, the insertion loss does not increase as dramatically for higher numbered components. For the third component having the second highest insertion loss, the insertion loss is $I_{TL}+4*I_{RL}$. The highest insertion loss is associated with the eighth component, which has been reflected by four filters and transmitted by two filters. Consequently, the insertion loss for the eighth component is equal to $2*I_{TL}+4*I_{RL}$. The transmission loss, $I_{TL}$, is still typically approximately 0.4 dB. The reflection loss, $I_{RL}$, is also typically about 0.3 dB. Consequently, the worst case insertion loss for the WDM 100 is 2.0 dB. The WDM 100, therefor, achieves approximately a twenty percent reduction in insertion loss.

Note that if the input signal on fiber 101 had contained sixteen components, the WDM 100 could function adequately by separating the components into two or more groups, then isolating the components in each group. In one embodiment, one or more components, such as the eighth component might be isolated prior to separating the signal into a plurality of groups. If the components are separated into two groups then isolated by such a WDM, a reduction in worst case insertion loss would still be achieved. Such a WDM would have a worst case insertion loss of $2*I_{TL}+8*I_{RL}$, or approximately 3.2 dB. In contrast, a conventional cascade WDM, such as the WDM 10 described in FIG. 1, would have a worst case insertion loss of $I_{TL}+15*I_{RL}$, or approximately 4.9 dB. Consequently, even for a higher number of components, a WDM in accordance with the method and system achieves a lower insertion loss.

A method and system has been disclosed for a multiple wavelength division multiplexer having reduced insertion loss. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A wavelength division multiplexer for separating an optical signal into a plurality of components comprising:

a filter for isolating one component of the plurality of components, the one component of the plurality of components being a component separating the first plurality of components from the second plurality of components;

a splitter for separating a portion of the optical signal into a plurality of groups, the splitter including a splitter input coupled to the filter, the portion of the optical signal remaining after the one component is isolated, each group containing a portion of the plurality of components, the plurality of groups including a first group and a second group, the first group including a first plurality of components, the second group containing a second plurality of components, the plurality of components of the optical signal including the first plurality of components and the second plurality of components, the one component separating the first plurality of components and the second plurality of components; and a plurality of isolators coupled to the splitter, the plurality of isolators corresponding to the plurality of groups, each of the plurality of isolators for isolating each component of the corresponding group, the plurality of isolators including a first isolator and a second isolator, the first isolator including a first plurality of filter corresponding to the first group, each filter of the first plurality of filters for isolating a component the first plurality of components, the first plurality of filters being coupled to be cascaded in series, the second isolator including a second plurality of filters corresponding to the second group, each filter of the second plurality of filters for isolating a particular component of the second plurality of components, the second plurality of filters being coupled to be cascaded in series.

2. The wavelength division multiplexer of claim 1 wherein the splitter further comprises a band pass filter.

3. A method for providing a wavelength division multiplexer, the wavelength division multiplexer for separating an optical signal into a plurality of components comprising the steps of:

providing a filter for isolating one component of the plurality of components, the one component of the plurality of components being a component separating the first plurality of components from the second plurality of components;

providing a splitter for separating a portion of the optical signal into a plurality of groups, the splitter including a splitter input coupled to the filter, the portion of the optical signal remaining after the one component is isolated, each group containing a portion of the plurality of components, the plurality of groups including a first group and a second group, the first group including a first plurality of components, the second group containing a second plurality of components, the plurality of components of the optical signal including the first plurality of components and the second plurality of components, the one component separating the first plurality of components and the second plurality of components; and providing a plurality of isolators coupled to the splitter, the plurality of isolators corresponding to the plurality of groups, each of the plurality of isolators for isolating each component of the corresponding group, the plurality of isolators including a first isolator and a second isolator, the first isolator including a first plurality of filter corresponding to the first group, each filter of the first plurality of filters for isolating a component the first plurality of components, the first plurality of filters being coupled to be cascaded in series, the second isolator including a second plurality of filters corresponding to the second group, each filter of the second plurality of filters for isolating a particular component of the second plurality of components, the second plurality of filters being coupled to be cascaded in series.

4. The method of claim 3 wherein the step of providing the splitter further comprises the step of providing a band pass filter.

5. A method for separating an optical signal into a plurality of components comprising the steps of:

isolating one component of the plurality of components, the one component of the plurality of components being a component separating a first plurality of components from a second plurality of components;

splitting a portion the optical signal remaining after isolation of the one component, the portion of the optical signal being split into a plurality of groups, each group containing a portion of the plurality of components, the plurality of groups including a first group and a second group, the first group including the first plurality of components, the second group containing the second plurality of components, the plurality of components of the optical signal including the first plurality of components and the second plurality of components, the one component separating the first plurality of components and the second plurality of components; and isolating each component of each group using a plurality of isolators, each of the plurality of isolators for isolating each component of the corresponding group, the plurality of isolators including a first isolator and a second isolator, the first isolator including a first plurality of filter corresponding to the first group, each filter of the first plurality of filters for isolating a component the first plurality of components, the first plurality of filters being coupled to be cascaded in series, the second isolator including a second plurality of filters corresponding to the second group, each filter of the second plurality of filters for isolating a particular component of the second plurality of components, the second plurality of filters being coupled to be cascaded in series.

6. A wavelength division multiplexer for separating an optical signal into a plurality of components comprising:

a filter for isolating one component of the plurality of components, the one component of the plurality of components being a component separating the first plurality of components from the second plurality of components;

a splitter for separating a portion of the optical signal into a plurality of groups, the splitter including a splitter input coupled to the filter, the portion of the optical signal remaining after the one component is isolated, each group containing a portion of the plurality of components, the plurality of groups including a first group and a second group, the first group including a first plurality of components, the second group containing a second plurality of components, the plurality of components of the optical signal including the first plurality of components and the second plurality of components, the one component separating the first plurality of components and the second plurality of components; and a plurality of isolators coupled to the splitter, the plurality of isolators corresponding to the plurality of groups, each of the plurality of isolators for isolating each component of the corresponding group, the plurality of isolators including a first isolator and a second isolator, the first isolator including a first plurality of filter corresponding to the first group.

\* \* \* \* \*